Aug. 30, 1932.   F. E. CARLSON   1,875,218
WEIGHING SCALE
Filed Feb. 2, 1929
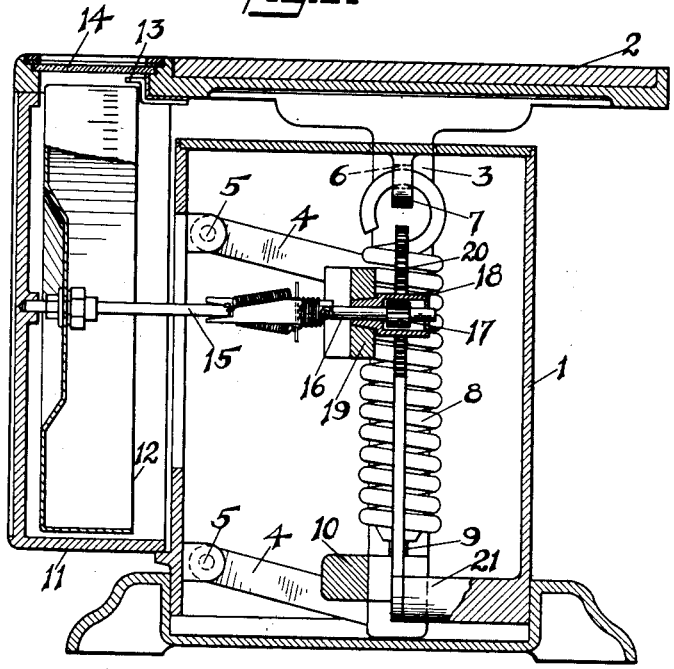
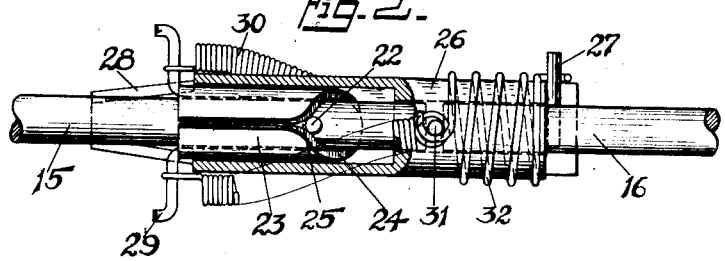
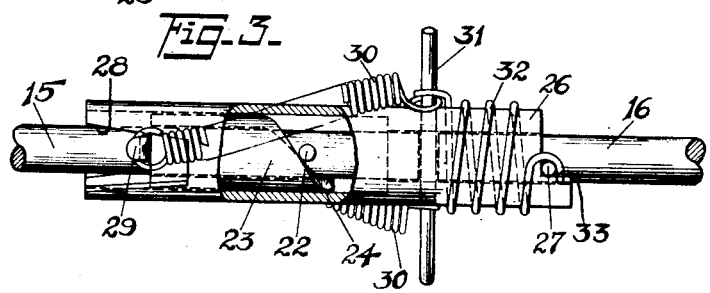

Patented Aug. 30, 1932

1,875,218

UNITED STATES PATENT OFFICE

FREDERICK E. CARLSON, OF NEW BRITAIN, CONNECTICUT, ASSIGNOR TO LANDERS, FRARY & CLARK, OF NEW BRITAIN, CONNECTICUT, A CORPORATION OF CONNECTICUT

WEIGHING SCALE

Application filed February 2, 1929. Serial No. 337,124.

This invention relates to improvements in indicating devices, such, for example, as weighing scales, and more particularly to an improved means for translating the force or load to be measured into movement of the indicator or dial.

While the invention in its broader aspects may find application in many uses it is exemplified herein in connection with a weighing scale of the so-called bathroom type. Such a scale comprises a platform on which a person may stand and a dial adjacent the platform whereby the entire apparatus is small and compact. In certain aspects, the present invention is an improvement on the scale disclosed in an application filed by me on November 18, 1927, Serial No. 234,073. In that application, I have disclosed a scale provided with a yielding connection for converting the movements of the weighing platform under its load into indicating movements of the dial, the connection being such as to translate movement under easy or gradually applied loads and to yield under suddenly applied loads whereby the sudden movements are not transmitted but taken up in the springs of the connection. By such connection, there is provided a scale that will withstand hard usage, such, for example, as the sudden application of a load, as when a person jumps on the scale.

It is an object of the present invention to provide an improvement on the type of scale referred to, in which the indicating dial is allowed to spin freely upon sudden application of the load, thereby avoiding danger of strain or injury to the parts.

With this general object in view the invention consists in the features, combinations, details of construction and arrangements of parts which will first be described in connection with the accompanying drawing and then more particularly pointed out.

In the drawing:—

Figure 1 is a sectional elevational view of a scale constructed in accordance with the present invention;

Figure 2 is an enlarged detail view, partly in elevation and partly in section, of the transmitting connection;

Figure 3 is a view similar to Figure 2, showing the parts in a different position.

The scale illustrated, by way of example, is of the general type disclosed in my prior application referred to above, although certain details are omitted and the arrangement is simplified to emphasize the improved features. The apparatus includes a main or stationary frame, 1, adapted for disposition on a floor or other horizontal support. A weighing platform, 2, is carried by a movable frame, 3, partially housed within the stationary frame 1. The movable frame may be movably connected to the stationary frame, as by links, 4, pivoted to the movable frame and to the stationary frame 1 as at 5. The apparatus may also be provided with suitable guiding means for the moving parts, as in my prior application.

A weighing spring connection is provided between the movable frame and the stationary frame. In the construction shown, this connection takes the form of a spring, 8, hooked at its upper end into a suitable hole, 6, in a supporting hanger, 7, carried by the stationary frame and at its lower end anchored to the movable frame in any desired manner, as by an anchor bolt, 9, which passes through the crosspiece 10 of the movable frame.

When a load to be weighed is placed on the weighing platform, the resulting downward movement of the frame is opposed by the spring, 8, and the movement is proportional to the weight of the load. Upon the removal of the weight, the spring contracts and returns the parts to normal position.

The movements of the weighing platform are translated into movements of an indicating dial and communicated thereto, as hereinafter described. The dial, 12, is positioned in a dial housing, 11, on the front side of the stationary frame. The dial is of the drum type bearing suitable graduated indices. The upper side of the dial housing has a window, 14, and the dial cooperates with a pointer, 13, beneath the window so that the dial readings may be readily viewed from above and by a person standing on the scale platform.

The dial is mounted on the portion 15 of a split shaft. The other portion, 16, of the shaft derives its movement from that of the scale platform, and, to this end has a pinion 17, enclosed in a pinion housing 18 mounted in a cross-piece 19 of the movable frame. The pinion meshes with a rack, 20, which is secured in stationary position to a boss 21 of the main frame. When the platform is depressed, the pinion is rotated by riding down the rack and the resulting rotation of shaft portion 16 rotates portion 15 through the transmitting connection characterizing this invention.

The invention in its entirety includes a separable driving connection between the two shafts 15, 16. Although capable of various constructions, in that here shown as an example, embracing the adjacent ends of shafts 15, 16 is a sleeve 26. Between this sleeve 26 and shaft 16 is a yieldable driving connection comprising a pin 27 on the shaft and a shoulder or abutment 33 on the sleeve. This abutment is normally held against pin 27 by a coiled spring 32 connected to pin 27 and to a pin 31 on sleeve 26. Pin 31 also serves to separate shafts 15, 16. The function of this yieldable connection is hereinafter referred to but for the present it will be seen that under normal conditions spring 32 causes sleeve 26 to rotate as one with shaft 16.

Embracing dial shaft 15 and enclosed within sleeve 26 is a freely movable sleeve 23 having at one end a barrel cam surface 24 and a depression 25. On dial shaft 15 is a pin 22 normally seated in depression 25. With the parts in this position (Figure 2) rotation of sleeve 23 causes rotation of dial shaft 15.

There is provided means for causing rotation of sleeve 23 upon rotation of sleeve 26. In the present exemplification, on sleeve 23 are two diametrically disposed hooks or abutments 29 located in recesses or notches 28 formed in actuating sleeve 26. As sleeve 26 rotates, therefore, the edges of these notches engaging hooks 29 cause the two sleeves to rotate as one.

There is provided means for normally but yieldably holding sleeve 23 so that pin 22 is seated in depression 25. As here shown as an example, connected between each hook 29 and pin 31 is a coiled spring 30. These springs tend to move sleeve 23 to the right, as viewed in Figures 2 and 3, thus normally holding depression 25 in engagement with pin 22.

In operation, and assuming what may be considered a normal application of the load on platform 2, drive shaft 16 is rotated by rack 20 and pinion 17 and sleeve 26 rotates with it by virtue of the connection described. This connection can yield so that spring 32 takes up any initial shocks or jars. But except for such yield, shaft 16 and sleeve 26 rotate as one. In addition, it is noted that the connection described, holding abutment 33 against pin 27, takes up any lost motion due to wear of the parts which might otherwise affect true weight readings. As sleeve 26 rotates, the sides of notches 28 engaging hooks 29 cause sleeve 23 to rotate in unison. Finally, by the engagement of depression 25 with pin 22, dial shaft 15 is caused to rotate with sleeve 23. As a result, the dial is moved in proportion to the applied load and so indicates the weight thereof. Upon removal of the load, the parts are similarly but reversely rotated back to initial position.

Under what may be termed abnormal conditions, such as the sudden application of a load, as by a person jumping on the platform, the drive connection is disconnected and the dial permitted to spin independently. As before, initial shocks are taken up by spring 32. Thereafter, rotation of sleeve 26 starts rotation of dial shaft 15 as above described. But, under these abnormal conditions, the momentum of shaft 15 causes it to run ahead of sleeve 23. As a result, pin 22 rides out of depression 25 and displaces sleeve 23 axially against the force of springs 30 (Figure 3). This, in effect, disconnects the dial shaft from its actuating mechanism and dial shaft and dial now spin independently of the latter. As shaft 15 thus rotates freely, pin 22 rides on cam surface 24 and the tendency of springs 30 to restore sleeve 23 to normal position damps or softens the spin of the dial. Ultimately, the momentum of the dial lessens sufficiently to permit springs 30 to restore sleeve 23 to normal position with pin 22 seated in depression 25. In other words, the driving connection that was disconnected is automatically restored and thereafter all the parts move in unison to cause the dial to indicate the true weight.

With the construction described, undue strains and injury to the parts are avoided, even when a person jumps on the platform. Consequently, the scale can stand the most severe usage without injury to the parts that might result in errors in dial readings or otherwise affect the proper functioning of the scale.

What is claimed is:—

1. In an indicating device, and in combination a dial, means for actuating the dial, means for connecting the dial and the actuating means, and means for automatically disconnecting the actuating means from the dial upon the sudden application of the actuating means.

2. In an indicating device, and in combination a dial, a shaft therefor, a driving shaft for the dial shaft, separable connecting means between the two shafts normally in connecting position having means for automatically causing the disconnection of the shafts upon the sudden actuation of the driving shaft, and means for automatically restoring the connection.

3. In an indicating device, and in combination a dial, a shaft therefor, a driving shaft for the dial shaft, separable connecting means between the two shafts normally in connecting position comprising a pin and a sliding sleeve on the dial shaft, means for yieldingly holding the sleeve in engagement with the pin, and means for rotating the sleeve from the driving shaft whereby the sleeve rotates the dial shaft.

4. In an indicating device, and in combination, a dial, a shaft therefor, a driving shaft, a sleeve freely movable on said dial shaft and having a cam surface and a depression on one end, means for causing rotation of said sleeve upon rotation of said driving shaft, a pin on said dial shaft, and spring means for yieldingly holding the sleeve so that said pin is engaged in said depression normally to cause unitary rotation of sleeve and dial shaft but permitting the sleeve to be displaced axially by the action of the pin riding up said cam surface thereby to disconnect the dial shaft from the sleeve.

5. In a scale, and in combination, a scale platform, a driving shaft, means for causing rotation of said driving shaft upon movement of the scale platform, a dial, a shaft therefor, a separable driving connection between the two shafts, and spring means tending to hold said connection in driving position but permitting disconnection thereof upon sudden application of load to the scale platform.

6. In a scale, and in combination, a scale platform, a driving shaft, means for causing rotation of said driving shaft upon movement of the scale platform, a rotary dial, a shaft therefor, a sleeve freely movable on the dial shaft and having a cam surface and a depression at one end, means for causing rotation of said sleeve upon rotation of the driving shaft, a pin on said dial shaft, and spring means for yieldingly holding the sleeve so that said pin is engaged in said depression normally to cause unitary rotation of sleeve and dial shaft but permitting the sleeve to be displaced axially by the action of the pin riding up said cam surface thereby to disconnect the dial shaft from the sleeve.

7. In a scale, and in combination, a scale platform, a driving shaft, means for causing rotation of said driving shaft upon movement of the scale platform, a rotary dial, a shaft therefor, a sleeve enclosing the adjacent ends of the two shafts, a pin on said driving shaft, an abutment on said sleeve, a spring connected between said pin and said sleeve tending to hold the abutment against said pin, a second sleeve freely movable on the dial shaft and having at one end a cam surface and a depression, a pin on the dial shaft, means for causing rotation of said second sleeve upon rotation of the first sleeve, and spring means tending to hold said second sleeve so that said second-named pin is engaged in said depression, normally to cause unitary rotation of the second sleeve and the dial shaft but permitting the second sleeve to be displaced axially by the action of the second-named pin riding up said cam surface, thereby to disconnect the second sleeve from the dial shaft.

In testimony whereof, I have hereunto set my hand.

FREDERICK E. CARLSON.